United States Patent [19]

May et al.

[11] Patent Number: 5,757,616

[45] Date of Patent: May 26, 1998

[54] PHYSICAL SECURITY SYSTEM FOR PORTABLE COMPUTER

[75] Inventors: Gregory J. May; Masahiko Muranami, both of Corvallis, Oreg.

[73] Assignee: Hewlett-Packard Company, Palo Alto, Calif.

[21] Appl. No.: 742,786

[22] Filed: Oct. 31, 1996

[51] Int. Cl.$^6$ .............................. G06F 1/16; H05K 7/10; E05B 73/00

[52] U.S. Cl. .............................. 361/683; 361/726; 70/58

[58] Field of Search .............................. 364/708.1; 70/58, 70/280–282; 361/680–686, 725–727

[56] References Cited

U.S. PATENT DOCUMENTS

5,255,154  10/1993  Hosoi et al. .............................. 361/681
5,530,620   6/1996  Sangveraphunsiri .............................. 361/686

*Primary Examiner*—Michael W. Phillips

[57] ABSTRACT

A notebook computer includes physical security apparatus for locking a display and system unit together in a 'clamshell' configuration. The security apparatus also prevents removal of peripheral devices and disables inputs from the computer keyboard and mouse. In some modes of operation the security apparatus also prevents powering up the computer and undocking of the computer from a docking station. A single user action results in locking the clamshell, locking the peripheral units in place and disabling the keyboard and mouse. Similarly, a user single action results in turning off the security measures (e.g., unlocking the clamshell, unlocking the peripheral units and enabling the keyboard and mouse).

22 Claims, 7 Drawing Sheets

PHYSICAL SECURITY SYSTEM FOR PORTABLE COMPUTER

BACKGROUND OF THE INVENTION

This invention relates generally to portable computers, and more particularly to methods and apparatus for securing access to portable computers.

There are many types of general purpose and specialized computers used for a variety of computing applications. The personal computer and computer work station are popular computer system architectures available in many different configurations having any of several different processors (e.g., 80386, 80486, 586, PENTIUM™, PowerPC™, Alpha) and operating systems (e.g., DOS, Windows 95, Windows NT, UNIX, MAC-OS, OS/2). Different categories by case size, include desktop computer, laptop computer, notebook computer and palm-top or hand-held computer. The laptop, notebook, and palm-top or hand-held computers also are referred to as portable computers.

A portable computer is a popular configuration enabling increased mobility for a user. Typically, a processor board, display and keyboard are integrated into a common case. A notebook computer case typically includes a display housing and a keyboard housing permanently attached via a hinged relationship. A flat panel display is mounted within the display housing. A keyboard, motherboard, data storage unit(s), expansion slot(s), and I/O ports are mounted in the keyboard housing. Modular peripheral units such as a floppy drive, hard drive, CD-ROM drive and modem or other PC card are readily installed and removed from the case. A conventional notebook computer is approximately the size of a standard sheet of paper (e.g., 21.6 cm by 27.9 cm; or in English units—8.5 inches by 11.0 inches) and weighs under six pounds. The thickness of such a notebook computer typically is 4.5 cm to 6.0 cm. The small size and weight and the integral nature of the notebook computer make it readily transportable. Such attributes, however, also make the computer and its modular units easier theft targets. Accordingly, there is a need for deterring theft of the portable computer and its modular units.

Portable computers are increasingly relied upon by persons, companies and institutions to perform various tasks. The computer often serves as a data entry terminal, communication device, information storage center, and/or an information processing center. The information stored on computers often exceeds the value of the computer itself. Accordingly, there is a need to prevent unauthorized access to the portable computer and its stored data.

SUMMARY OF THE INVENTION

This invention is directed to physical security measures for restricting access to a portable computer and its modular units, devices and components. According to the invention, a portable computer includes physical security apparatus for locking a display and system unit together (e.g., in a 'clamshell' configuration). The security apparatus also prevents removal of peripheral devices and disables inputs from the computer keyboard and mouse. In some modes of operation the security apparatus also prevents powering up the computer and undocking of the computer from a docking station.

According to one aspect of the invention, the computer is placed in either a locked state or an unlocked state. In the locked state peripheral devices are locked into the computer case and the keyboard and mouse are disabled. If the computer case is closed, the case also is precluded from opening.

According to another aspect of the invention, a linkage structure moves between a locked position which defines the locked state and an unlocked position which defines the unlocked state. A key lock or combination lock (e.g., tumbler; keypad) secures the linkage structure in the locked position. A user unlocks the key lock or combination lock to move the linkage from the locked position to the unlocked position. In some embodiments the linkage structure moves automatically into the unlocked position when the key is turned or the correct combination is entered. Conversely, when the user moves the linkage structure from the unlocked position to the locked position, the key lock or combination lock in some embodiments automatically locks. One advantage of the security system is that a single action (e.g., moving the linkage to the locked position) results in locking the clamshell, locking the peripheral units in place and disabling the keyboard and mouse. Similarly, a single action (e.g., unlocking the key lock or combination lock) results in turning off the security measures (e.g., unlocking the clamshell, unlocking the peripheral units and enabling the keyboard and mouse).

According to another aspect of the invention, a user leaving the power on when putting the computer in a locked state, is still able to access the ports (other than the mouse port). Thus, a user can allow the computer to perform unattended functions such as retrieving e-mail, performing automatic back-ups, or waiting for a fax transmission. The unaffected external communications occur via a LAN connection, modem connection, docking connection or other port connection.

According to another aspect of the invention, a user is able to specify whether to leave the system on/off button functioning normally or to disable such on/off button while the computer is in the locked state. If left functioning normally, a user can turn the power on to enable external communications via a LAN connection, modem connection, docking connection or other port connection.

According to another aspect of the invention, the portable computer is prevented from undocking from a docking unit while the computer is in the locked state.

According to a preferred embodiment a portable computing includes a first housing, second housing, a lock and linkage. A display panel is mounted in the first housing. A keyboard, a processing unit and a modular unit are mounted in the second housing. In a preferred embodiment the lock and linkage also are mounted in the second housing. The second housing defines an opening. The modular unit is removably inserted within the opening. The first housing moves relative to the second housing between an open position for viewing the display panel and a closed position at which the display panel is held to the second housing. The lock defines at a given time either one of a locked condition and an unlocked condition. The linkage is coupled to the lock. The linkage moves between a first position and a second position. The linkage blocks, limits or otherwise prevents removal of the modular unit while in the first position. The linkage also prevents opening of the first housing relative to the second housing when the first housing is in the closed position and the linkage is in the first position. The linkage is prevented from moving into the second position while the lock defines the locked condition. The linkage automatically moves into the second position when the lock switches into the unlocked condition.

The computing apparatus also includes an input device for a user to issue commands to the computing apparatus and a first circuit which disables the keyboard and the input device while the linkage is in the first position. The first circuit enables the keyboard and input device while the linkage is in the second position. A second circuit optionally disables a component (e.g., on/off switch) of the apparatus while the linkage is in the first position. A third circuit has a first state during which the computing apparatus is precluded from being undocked from a docking station and a second state during which the circuit does not preclude the computing apparatus from being undocked from the docking station. The third circuit is in the first state while the linkage is in the first position and is in the second state while the linkage is in the second position.

The linkage includes a slide switch and a link. The slide switch defines a switch first position and a switch second position. The link moves between the linkage first position and the linkage second position. The linkage also includes a first member fixed relative to the link which blocks, limits or otherwise prevents removal of the modular unit while the linkage is in the first position. A second member fixed relative to the link blocks, limits or otherwise prevents movement of the first housing out of the closed position while the first housing is in the closed position relative to the second housing and the linkage is in the first position. The link first position corresponds to the switch first position and the link second position corresponds to the switch second position.

A method for securing access to the portable computing apparatus includes defining a locked state for the computing apparatus by moving the linkage into the first position and defining an unlocked state for the computing apparatus by switching the lock into the unlocked condition. While the linkage is in the first position, the linkage blocks, limits or otherwise prevents removal of the modular unit and prevents opening of the first housing relative to the second housing when the first housing is in the closed position. The first circuit switches into the first state as the linkage moves into the first position disabling the keyboard and input device. The linkage is prevented from moving into the second position while the lock defines the locked condition. While the linkage is in the second position, the linkage does not prevent removal of the modular unit and does not prevent opening of the first housing relative to the second housing. The first circuit switches into the second state as the linkage moves into the second position. While in the second state the first circuit no longer disables the keyboard and pointing device.

Another step of the method includes configuring the computing apparatus to either one of enabling or disabling the second circuit. The step of defining the locked state includes entering the second circuit into the first state when the second circuit is enabled. While the second circuit is in the first state an on/off switch for activating the computing apparatus is disabled.

The third circuit has a first state during which the computing apparatus is precluded from being undocked from a docking station and a second state during which the circuit does not preclude the computing apparatus from being undocked from the docking station. The third circuit is in the first state while the linkage is in the first position and is in the second state while the linkage is in the second position. The step of defining a locked state includes entering the third circuit into the first state. The step of defining the unlocked state includes entering the third circuit into the second state.

One advantage of the invention is that a simple action is performed to switch the computer 10 into the locked state or the unlocked state (e.g., move slide button; or move slide button and set the lock). Another advantage is that the user can still allow unattended functions to be performed while security measures are active. Another advantage is that a user can configure some security measures to select optional components to be disabled with the security system (i.e., when the computer enters the locked state). These and other aspects and advantages of the invention will be better understood by reference to the following detailed description taken in conjunction with the accompanying drawings.

DESCRIPTION OF SPECIFIC EMBODIMENTS

Overview

Figure 1:
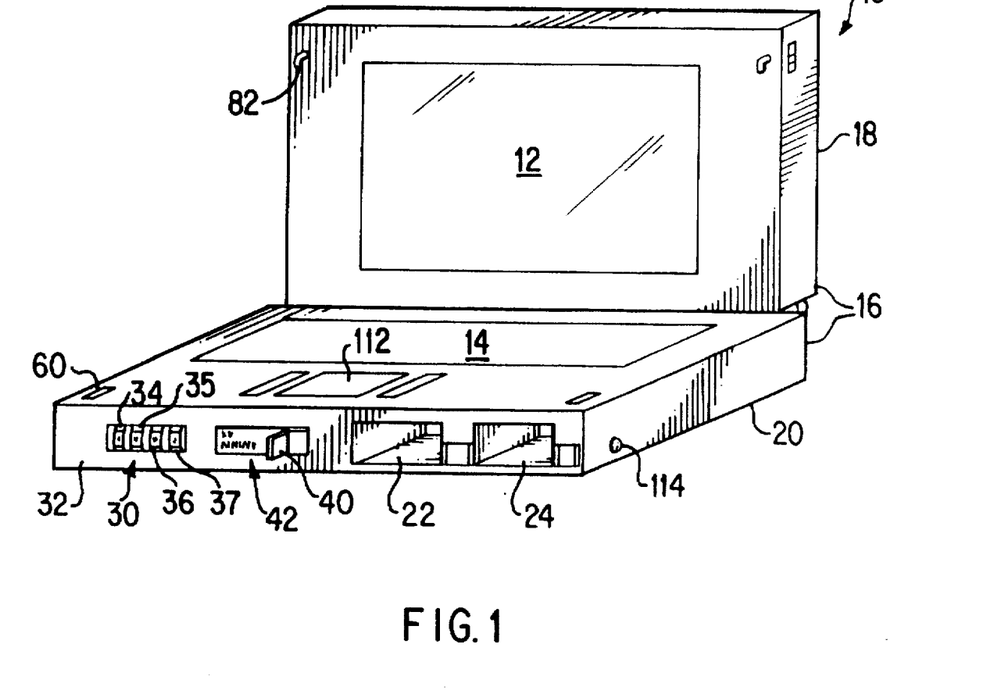
FIG. 1 is a perspective view of a notebook computer having a physical security system according to an embodiment of this invention.
Figure 2:
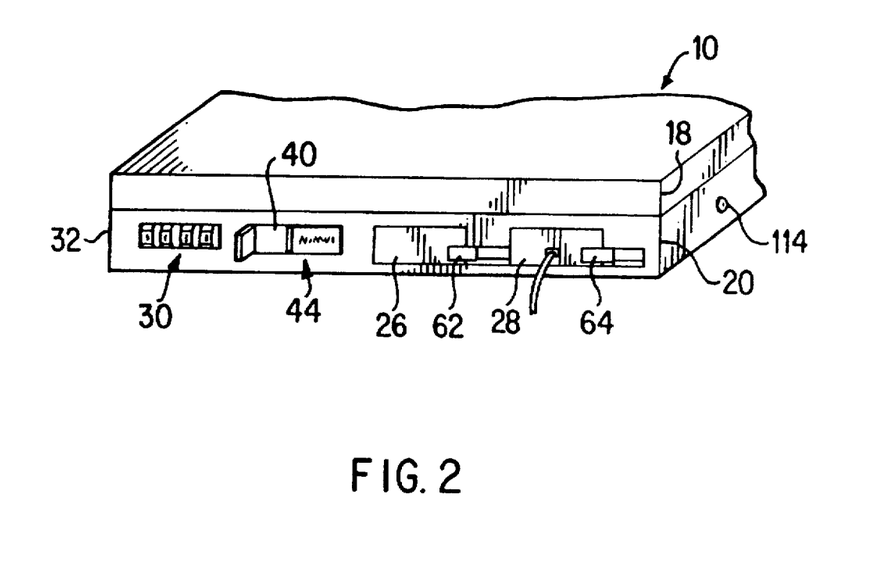
FIG. 2 is a partial perspective view of the notebook computer of FIG. 1 having modular units installed and the computer in a locked state.

FIGS. 1 and 2 show a portable computer 10 according to an embodiment of this invention. The portable computer 10 is a notebook computer, laptop computer, hand-held computer, personal digital assistant or other general purpose or specialized portable computing device. The portable computer includes a processing unit (not shown), display 12 and keyboard 14 integrated into a case 16. For a notebook computer embodiment the case 16 includes a display housing 18 and a keyboard housing 20 attached via a hinged relationship. A flat panel display 12 is mounted within the display housing 18. A keyboard 14, motherboard and I/O ports are mounted in the keyboard housing 20. Modular units such as batteries, a floppy drive, hard drive, CD-ROM drive and modem or other PC card are readily installed and removed via openings 22, 24 in the keyboard housing 20. FIG. 2 shows a notebook computer 10 having a hard drive 26 and modem 28 installed within the openings 22, 24.

According to one aspect of the invention a lock 30 is mounted within the keyboard housing 20. The lock 30 is accessible from one of the faces of the keyboard housing 20. In the illustrated embodiment the lock 30 is accessible from a front face 32. In various embodiments the lock is a key lock, a combination lock, or an electronic keypad lock. Mechanical tumblers, electrical relays or other conventional or to be developed lock structures define the internal lock components. Illustrated is a mechanical combination lock with tumblers 34–37 which respond to a four entry combination. Also shown on the front face 32 is a slide button 40. The slide button 40 moves between an unlocked position 42 (shown in FIG. 1) and a locked position 44 (shown in FIG. 2). The slide button 40 is movable from the unlocked position 42 to the locked position 44 regardless of the state of the lock 30. The slide button 40, however, can move from the locked position 44 to the unlocked position 42 only when tumblers 34–37 are set to the correct combination, (e.g., or a key turns a key lock to an unlocked position; or a keypad lock receives the correct entry sequence). Switching the slide button 40 into the locked position 44 places the computer 10 into a locked state. Switching the slide button 40 into the unlocked position 42 places the computer 10 in the unlocked state.

In a preferred embodiment the slide button 40 is biased toward the unlocked position. When a user unlocks the lock 30, the slide button 40 automatically moves into the unlocked position 42. Conversely when a user moves the slide button 40 into the locked position 44 in some embodiments the lock 30 automatically changes into a locked condition (e.g., the tumblers move, the key lock rotates or the key pad lock internal structure locks). In some embodiments the lock 30 does not automatically change into the locked condition when the slide button 40 moves into the locked position 44. The user instead manually changes the lock tumblers 34–37 or turns a key. Although a slide button 40 is shown, another mechanical, electrical, or optical switch, button, or latch is used in alternative embodiments.

Security Linkage Structure

Figure 3:
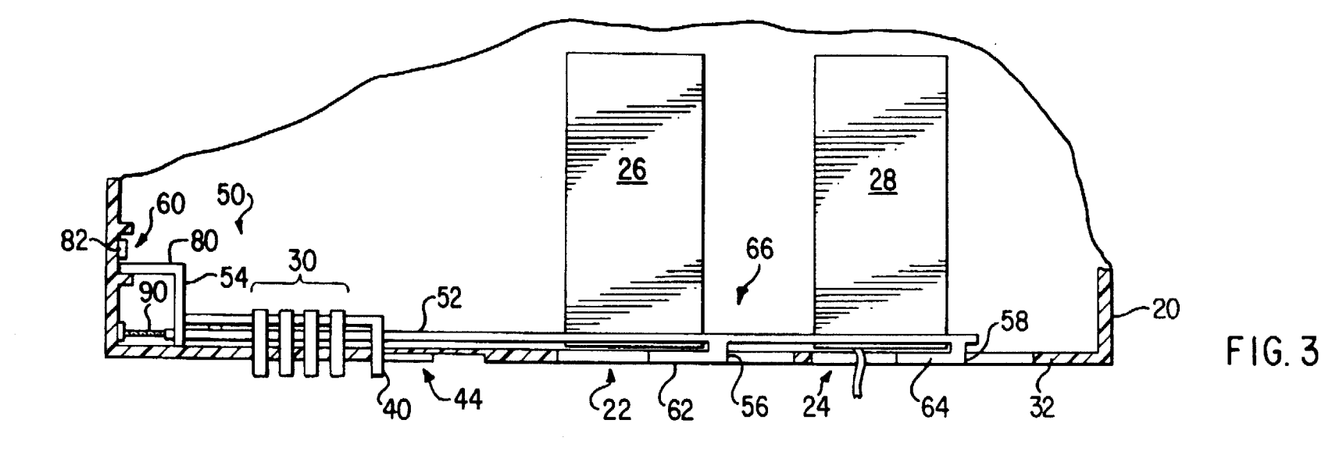
FIG. 3 is a partial, planar, cutaway view of the computer of FIG. 2 showing a linkage structure in the locked position according to an embodiment of this invention.
Figure 4:
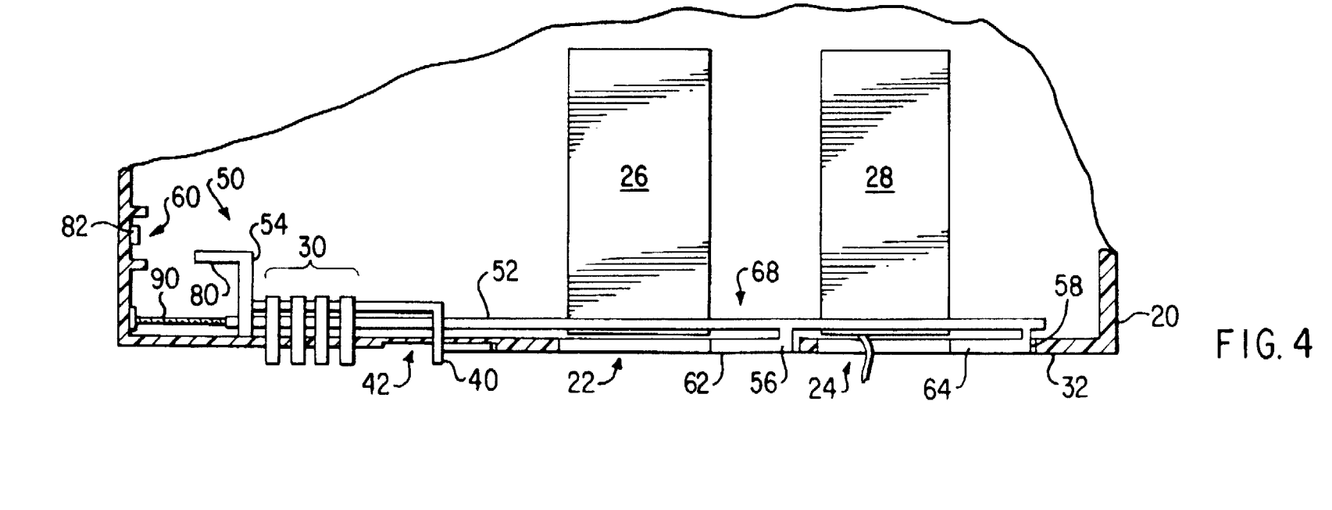
FIG. 4 is a partial, planar, cutaway view of the computer of FIG. 2 showing a linkage structure in the unlocked position according to an embodiment of this invention.

Referring to FIGS. 3 and 4 a linkage structure 50 moves between a locked position and an unlocked position with the slide button 40. The linkage structure 50 includes a rod 52 with multiple arms 54, 56, 58. One arm 54 extends to a display latch opening 60. Other arms 56, 58 include covers 62, 64 or other extensions for blocking, limiting or preventing removal of modular units 26, 28 positioned within openings 22, 24. The covers 62, 64 are fixed relative to the arms 56, 58. The arms 56, 58 are fixed relative s to the rod 52. Thus, as the rod 52 slides, the arms 56, 58 and covers 62, 64 move with the rod 52. The rod has two positions—a first 'locked' position 66 (see FIG. 3) corresponding to the sliding switch 40 locked position 44; and a second 'unlocked' position 68 (see FIG. 4) corresponding to the sliding switch 40 unlocked position 42. When the rod is in the first locked position 66, the covers 62, 64 block, limit or prevent removal of the modular units 26, 28. When the rod is in the second position 68, the covers 62, 64 are out of the insertion/removal path of the modular units 26,28. With the covers clear of the modular unit insertion/removal paths, the modular units 26, 28 can be installed or removed.

In the embodiment of FIGS. 3 and 4, the covers 62, 64 are visible from the front face 32 of the keyboard housing 20 while the rod 52 is in either of the first position 66 or the second position 68. In an alternative embodiment, the covers 62, 64 are visible only while blocking the openings 22, 24 (i.e., while the rod is in the first position 66). In such alternative embodiment the covers 62, 64 or a substantial portion of the covers slide behind a wall of the keyboard housing 20 out of plain sight when the rod 52 moves into the second position 68.

Figure 14:
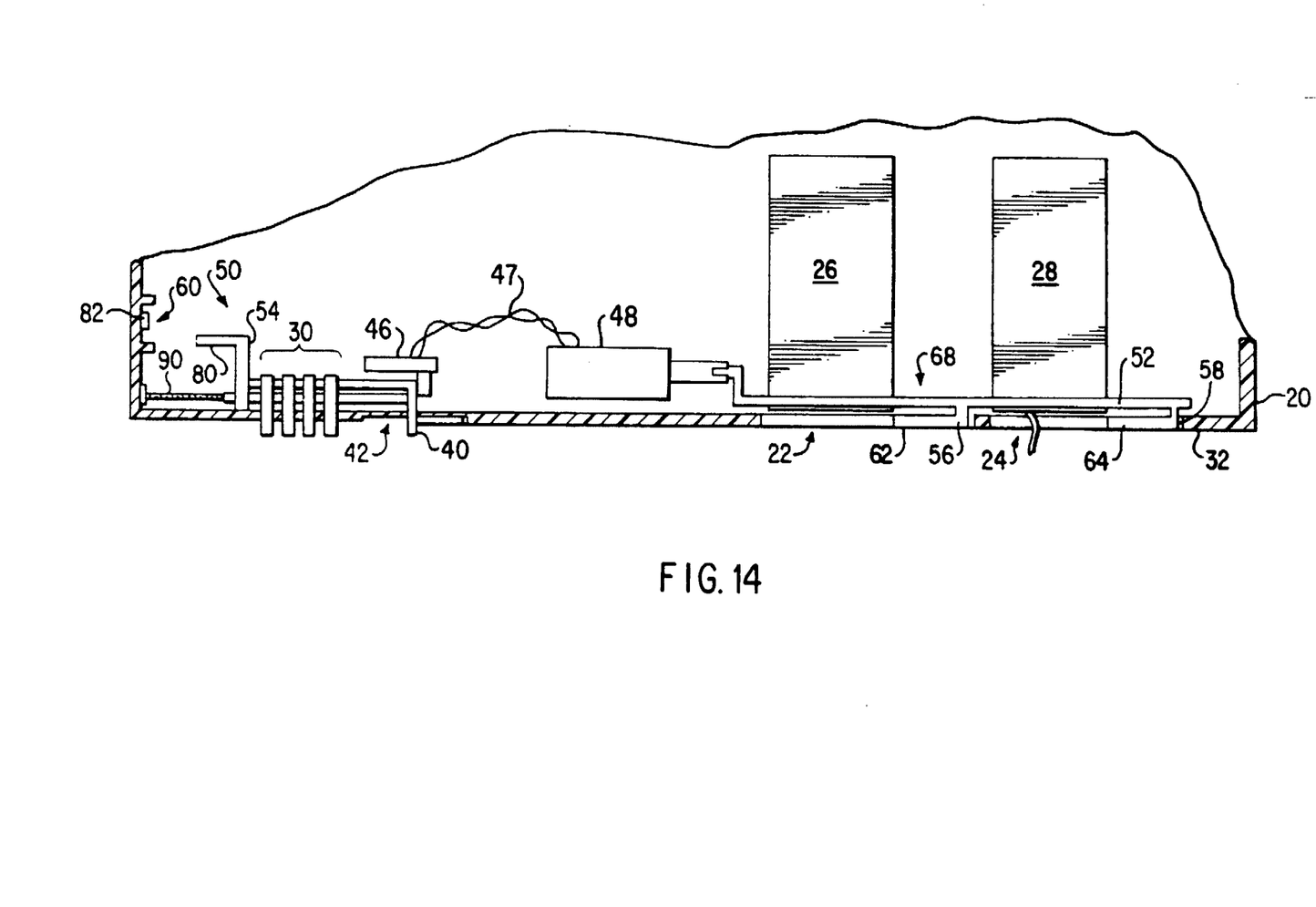
FIG. 14 is a partial, planar, cutaway view of the computer of FIG. 2 showing a linkage structure in the unlocked position according to an alternate embodiment of this invention.

While FIGS. 3 and 4 show linking structure 50 having a mechanical connection between slide button 40 and rod 52, an alternate embodiment has been contemplated and is shown in FIG. 14, where slide button 40 is coupled to electric switch 46, which in turn remotely activates rod 52 via solenoid 48. Solenoid 48 is shown coupled to switch 46 via wire 47, although this connection could be made via wireless means, such as infrared. In this embodiment, linking structure 50 is still considered to be coupled to lock 30, although this coupling is at least in part obtained electronically. Those skilled in the art will appreciate that linking structure 50 can take still other forms, such as electromagnetic, piezo electric, etc., and still be coupled to lock 30, and still fall within the spirit and scope of the invention.

Figure 5:
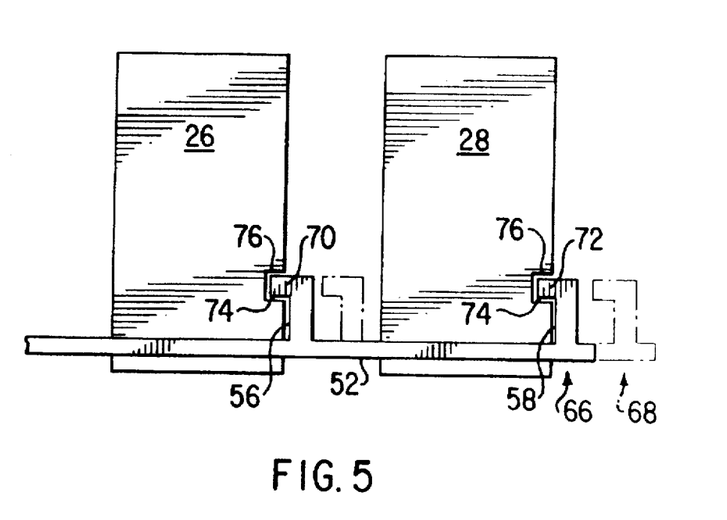
FIG. 5 is a diagram of a rod and arm portion of the linkage structure acting upon modular units according to an alternative embodiment of this invention.

FIG. 5 shows another alternative embodiment in which extensions 70, 72 are fixed relative to the arms 56, 58 in place of the covers 62, 64. Each modular unit 26, 28 includes a notch or recessed area 74 with an adjacent wall 76. As the rod 52 moves into the first position 66, the extensions 70, 72 move into the notch or recessed area 74 adjacent to the wall 76 to block, limit or prevent removal of the modular units 26, 28. The relative position of each extension 70, 72 and the wall 76 block, limit or prevent the corresponding modular unit 26, 28 from being removed or inserted through the openings 22, 24. In another embodiment the arms 56, 58 do not include extensions 70, 72. In such embodiment the arms 56, 58 move into the notch or recessed area 74 into a blocking, limiting or preventing relation relative to the walls 76. In yet another alternative embodiment, the rod 52 rotates between first and second positions, instead of sliding, to move the arms 56, 58, extensions 70, 72 or covers 62, 64 into or out of a blocking, limiting or preventing position. The notch or recessed area 74 occurs at or away from the sides and edges of a modular unit 26,28 according to alternative embodiments (e.g., along a face, between edges, in middle of module).

Referring to FIGS. 3, 4, 6 and 7, the function of arm 54 is now described. Arm 54 serves to lock a display latch 82 (see FIG. 1) and prevent it from unlatching from the keyboard housing 20. The display latch 82 is located on the display housing 18 and includes a hooked portion 84. The keyboard housing 20 includes an opening 60 into which the latch 82 is received. The opening 60 is bordered in part by a catch structure 86. In one embodiment the latch's hooked portion 84 rotates between an extended position and a retracted position. The hooked portion 84 is biased to the extended position and is limited to rotate no further than the extended position (see FIG. 6a).

Figure 6A:
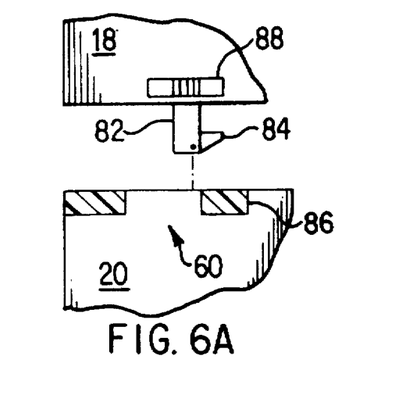
FIGS. 6a–d are diagrams showing the action between a display housing latch and keyboard housing catch structure according to an embodiment of this invention.
Figure 6B:
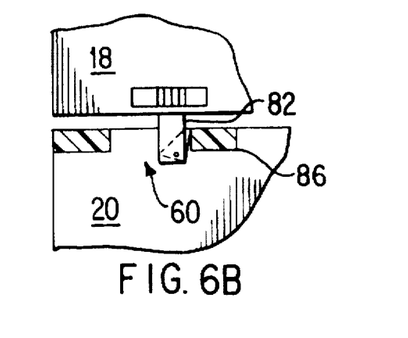
Figure 6C:
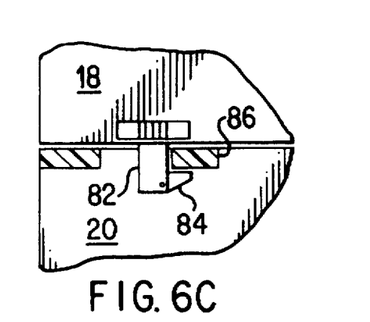
Figure 6D:
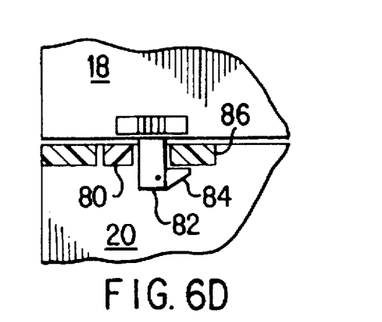

As the display housing 18 is closed to the keyboard housing 20, the hooked portion 84 bumps into the catch structure 86. As the display housing continues to close, the force applied to the display acts upon the hooked portion 84 at the catch structure 86 forcing the hooked portion 84 to rotate into the retracted position. (see FIG. 6b). As the display housing continues to close, the hooked portion 84 eventually clears the catch structure 86. The internal bias within the latch 82 then causes the hooked portion 84 to rotate back into the extended position (see FIG. 6c). The display housing 18 is now closed to the keyboard housing 20. FIG. 6d shows the latch 82 locked in place. According to an aspect of this invention, the extension 80 of arm 54 moves into the opening 60 adjacent the latch 82 when the rod moves into the first (i.e., locked) position 66 (see FIGS. 3 and 6d). While the extension 80 is in the opening 60, the display cannot be opened. While the extension is not in the opening the display can be opened.

To open the display while the rod 52 is in the unlocked position 68, the user moves a latch button 88 on the display housing 18. The latch button 88 moves the latch 82 laterally away from the catch structure 86 allowing the hooked portion 84 to clear the catch structure 86 freeing the display housing 18 to open relative to the keyboard housing 20. When the rod 52 is in the locked position 66, the arm 54 extension 80 fills the area into which the latch 82 would move to clear the catch structure 86. Thus, the latch 82 is blocked while the rod is in the locked position 66 preventing the display from opening.

In some embodiments the hooked portion 84 of the latch 82 is an integral portion which does not move relative to the rest of the latch 82. As the display is closed, the closing force is applied through the catch structure 86 to the hooked portion 84. The force causes the latch 82 and latch button 88 to move bringing the hooked portion 84 path away from the catch structure 86. When the display closes sufficiently, the hooked portion 84 clears the catch structure 86 removing the force between the catch structure 86 and latch 82/hooked portion 84. As a result, the latch 82 moves into its relaxed position. In the closed, relaxed position (see FIG. 6c) the catch structure 86 blocks vertical extraction of the hooked portion 84. The user must manually move latch button 88 to free the hooked portion 84 and allow the display to open.

Figure 7A:
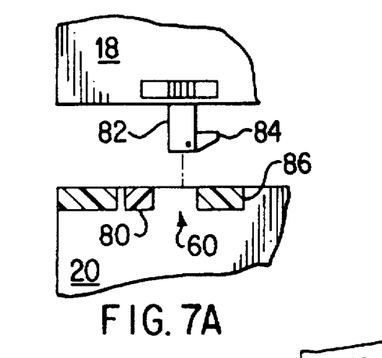
FIGS. 7a–c are diagrams showing the action between a display housing latch and keyboard housing catch structure according to an alternative embodiment of this invention.
Figure 7B:
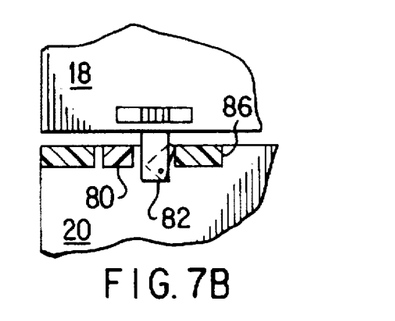
Figure 7C:
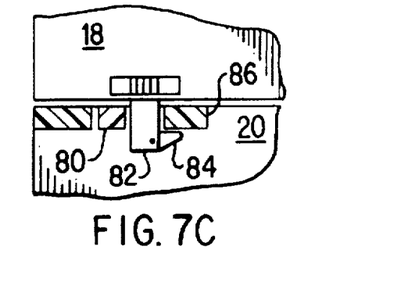

One advantage of having a latch 82 with a movable hooked portion 84 is that the display can be closed even when the linkage structure 50 is in the locked position 66. Referring to FIG. 7a, the opening 60 in the keyboard housing 20 is partially filled by the arm 54 extension 80 while the display is open and the linkage structure 50 is in the locked position. As the display closes, the latch 82 fits into the remainder of the opening 60. To do so, the hooked portion 84 is rotated into the retracted position. Specifically, the closing force applied to the display is translated to the hooked portion 84 by the contact between the hooked portion 84 and the catch structure 86 (see FIG. 7b). Once the display is closed sufficiently, the hooked portion 84 clears the catch structure 86 allowing the hooked portion 84 to return to its extended, biased relaxed position (see FIG. 7c).

With the display housing 18 closed to the keyboard housing 20 and the linkage structure 50 in the locked position 66, the latch button 88 cannot be moved to open the display because of the blocking presence of the arm 54 extension 80.

Referring again to FIGS. 3 and 4, the linkage structure 50 also includes a spring 90 and the slide button 40. The spring 90 is anchored at one end to the keyboard housing 20 and at another end to an end of the rod 52. The slide button 40 is coupled to the rod 52 forcing the rod 52 to move with the slide button 40, and conversely, the slide button 40 to move with the rod 52. The spring 90 biases the rod toward the second, unlocked position 68 (see FIG. 4). Thus, when the lock 30 opens/unlocks, the rod 52 is moved under the force of spring 90 into the unlocked position 68. In broader terms, the spring 90 automatically moves the linkage structure 50 into the unlocked position 68 when the correct combination is entered at the lock 30.

When the slide switch 40 is moved from the unlocked position 42 to the locked position 44, the rod 52 moves with the slide switch 40 to its locked position 66. In some embodiments the movement of the slide switch 40 (or rod 52) forces the tumblers 34–37 to move thereby putting the lock 30 in a locked state.

Component Disabling

Figure 8:
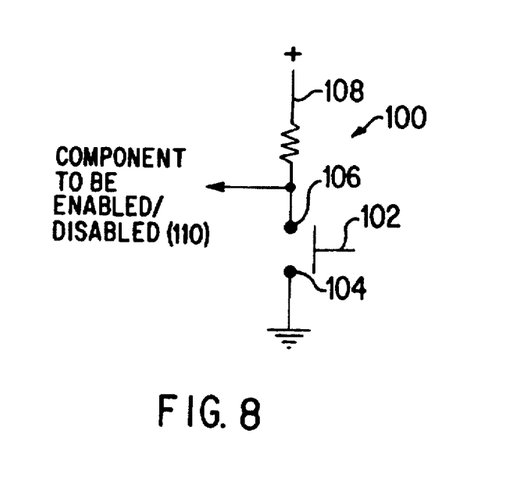
FIG. 8 is a schematic of a circuit for enabling/disabling access to desired system components.

FIG. 8 is an electrical schematic of an enable/disable circuit 100 responsive to the position of the slide button 40. The circuit 100 includes a switch 102 having one terminal 104 coupled to ground and another terminal 106 coupled to a power signal 108 and a component 110 being enabled/disabled. The switch 102 is positioned in either one of a first state or a second state. Movement of the slide button 40 into the locked position 44 puts the switch 102 into the first state. Movement of the slide button 40 into the unlocked position 42 puts the switch 102 into the second state. In the embodiment shown the first state corresponds to a closed switch and the second state corresponds to an open switch. When closed, the power signal 108 flows to ground, thereby disabling the desired component 110. When open, the power signal 108 flows to the desired component 110, thereby enabling such component.

According to an aspect of this invention, the circuit 100 is located in the power signal path for the keyboard 14 component, while another such circuit 100 is located in the power signal path for each desired input device 112 (e.g., integral mouse, touchpad, eraser head, trackball; external mouse, touchpad, or trackball; other internal or external pointing device and clicking device). Additionally, one or more other components such as the motherboard, processing unit, I/O port, local bus, video bus, expansion bus, peripheral device are similarly disabled and enabled according to desired configurations. According to a preferred embodiment, the keyboard and pointing/clicking devices are enabled and disabled according to the position of the slide button 40. In an alternative embodiment the movement of the slide button 40 instead triggers CPU 218 interrupt. The CPU 218 then processes the interrupt to disable one or more of an input device, bus, port, modular unit, component or device.

Figure 9:
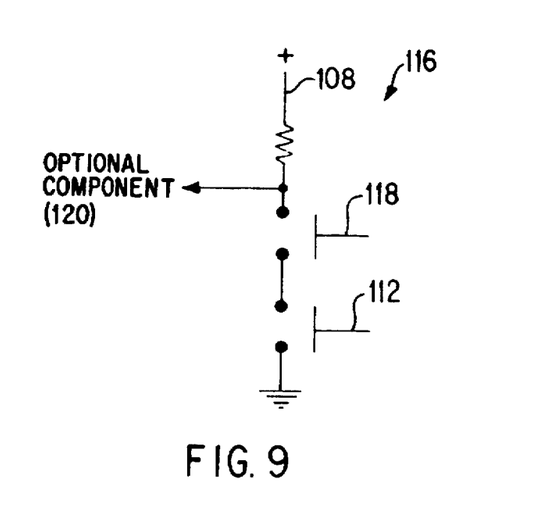
FIG. 9 is a schematic of a circuit for optionally enabling/disabling access to desired system components.

According to another aspect of the invention a user is given the option of whether some components are to be disabled during a locked position 66 of the slide switch 40. FIG. 9 shows a circuit 116 used with components for which a user is given such option. The circuit 116 is the same as the circuit 100, but includes an additional switch 118 which determines whether the switch 102 is active. The switch 118 is located in series with the switch 102 (e.g., as shown in FIG. 9), in parallel with the switch 102. In other embodiments the switch 118 instead is located in series or in parallel with the optional component 120, or in series with the power source. In still another embodiment, a multi-position switch is used in place of the switches 102, 118. The user controls the position of the switch 118 under software control. A circuit 116 is located in the power signal path for each optionally controlled component 120. When the user selects a component 120 to be disabled, the switch 118 closes. Otherwise the switch 118 is left is open. When closed the switch 118 enables the switch 102 to determine whether the component 120 is enabled or disabled. When the switch 118 is open the component 120 is enabled regardless of the position of switch 102. As a result, the component 120 is disabled only when circuit 116 is configured to close switch 118 and the slide switch 40 closes the switch 102. According to a preferred embodiment, a user is given the option of tying the system on/off switch 114 (see FIG. 1) to the state of the slide button 40 by placing the circuit 116 in the signal path of the on/off switch. According to other configurations, the circuit 116 is included in the power signal path of one or more other components such as the motherboard, processing unit, I/O port, local bus, video bus, expansion bus, or a peripheral device.

Disable Undocking Ability

Figure 10:
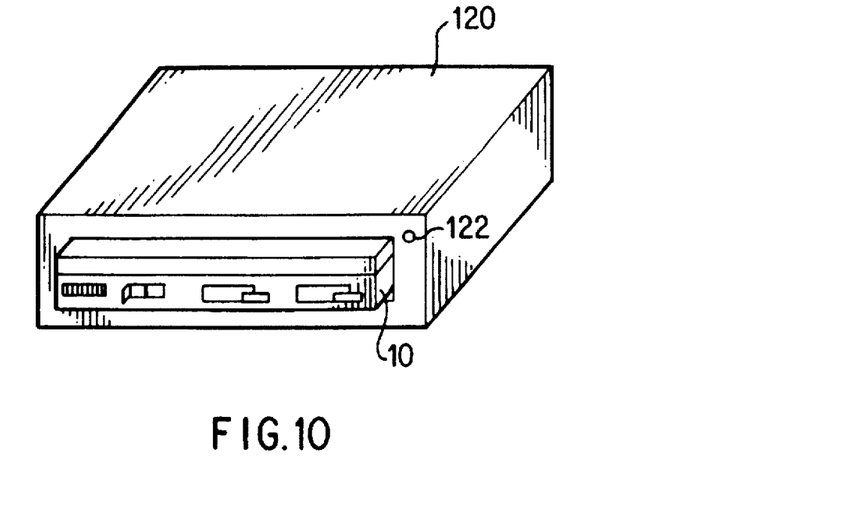
FIG. 10 is a perspective view of the notebook computer of FIG. 2 inserted into a docking station.

Referring to FIG. 10, the notebook computer 10 is shown inserted within a docking station 120. The function of the docking station 120 is to provide access to additional peripheral devices and to enhance the usability of the notebook computer system in a desktop environment. Because of the small size of notebook computers there often is not enough space to equip the system with all desired peripherals. The docking station provides access to additional peripherals, such as a floppy disk drive and CD-ROM drive. To enhance usability the docking station provides ports for hooking up an external keyboard and display monitor. Because the notebook computer 10 integrated display 12 and keyboard 14 are typically small to promote transportability, it is desirable at times to use the notebook computer with an external keyboard and monitor. Rather than changing the cables every time a user moves the notebook computer, the docking station provides an unchanging connection to the monitor and keyboard. Simply by inserting the notebook computer 10 into the docking station 120, connections between the notebook computer and an external keyboard, display and one or more peripheral devices are established.

Figure 11:
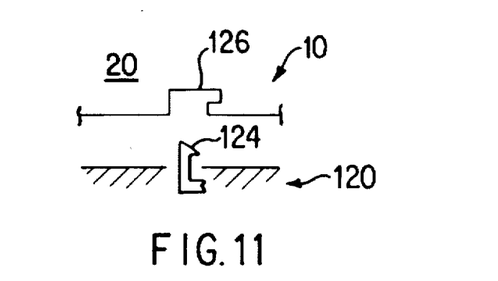
FIG. 11 is a diagram of a latch connection for securing the notebook computer to the docking station of FIG. 10.

The docking station 120 includes an eject button 122. When the button 122 is pushed, the notebook computer is ejected from the docking station 120. Referring to FIG. 11, the docking station also includes one or more latches 124 which mate into indentations 126 on the notebook computer keyboard housing 20. When the eject button 122 is pushed, the latch 124 releases from the indentation 126 and an actuator pushes the notebook computer outward from the docking station 120. In one embodiment the actuator serves to both move the latches 124 and eject the notebook computer 10. A user is unable to remove the notebook computer from the docking station 120 while the latch(es) 124 mate into the indentation(s) 126.

Figure 12:
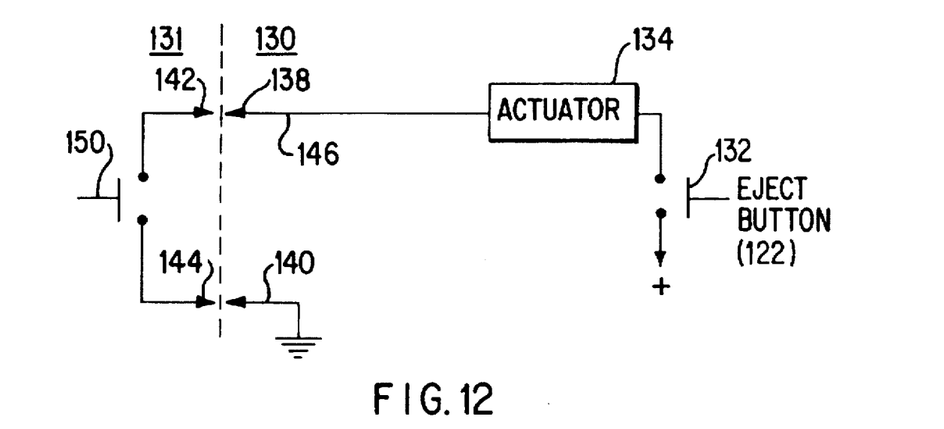
FIG. 12 is a schematic diagram of a circuit for controlling ejection of the notebook computer from the docking station according to an embodiment of this invention.

According to an aspect of this invention, the eject button 122 is disabled while the notebook computer's slide button 40 is in the locked position 44. FIG. 12 shows circuit 130, 131 for ejecting the notebook computer 10. Circuit 130 is located within the docking station 120. Circuit 131 is located within the notebook computer 10. The circuit 130 couples to the circuit 131 via contacts 138, 140 at the docking station 120 and contacts 142, 144 at the notebook computer 10. The contacts 138–144 are formed by pin connections between the notebook computer 10 and docking station 120. In one embodiment the pin connection are part of a multiple pin connector used for exchanging signals between the notebook computer and docking station. In another embodiment the pins/contacts 138–144 replace or supplement guide pins used for aligning an electrical connection between the notebook computer and docking station 120.

The circuit 130 includes a switch 132 and an ejection actuator 134. The switch 132 is coupled to a power signal. When the switch 132 is closed the power signal is fed through the actuator 134. When the circuit 130 is closed (via circuit 131), the signal path 146 is tied to ground, the actuator 134 is energized and the notebook computer 10 is ejected. When the circuit 130 is left open (e.g., at circuit 131) the actuator does not become active and the notebook is not ejected.

The circuit 131 includes a switch 150 within the notebook computer 10. The state of such switch 150 is defined by the position of the slide button 40. When the slide button 40 is in the unlocked position 42, the switch 150 is closed. When the slide button 40 is in the locked position 44, the switch 150 is open. First consider the condition where the slide button is in the unlocked position 42 and thus, the switch 150 is closed. When a user pushes the eject button 122, the switch 132 closes causing current to flow from the power source into the actuator 134, along path 146, across contacts 138, 142 through closed switch 150 across contact 144, 140 then to ground. The closed circuit 130,131 allows the actuator 134 to release and eject the notebook computer 10.

Next consider the condition where the slide button 40 is in the locked position 44, and thus, switch 150 is open. When a user pushes the eject button 122, the switch 132 closes causing current to flow from the power source into the actuator 134, along path 146, and across contacts 138, 142. Switch 150 in the notebook computer, however, is open resulting in an open circuit 131 and no return path for the current. Thus, the circuit 130 also is left open and the actuator does not activate. In effect, the actuator and the eject button are disabled.

Notebook Computer Architecture

Figure 13:
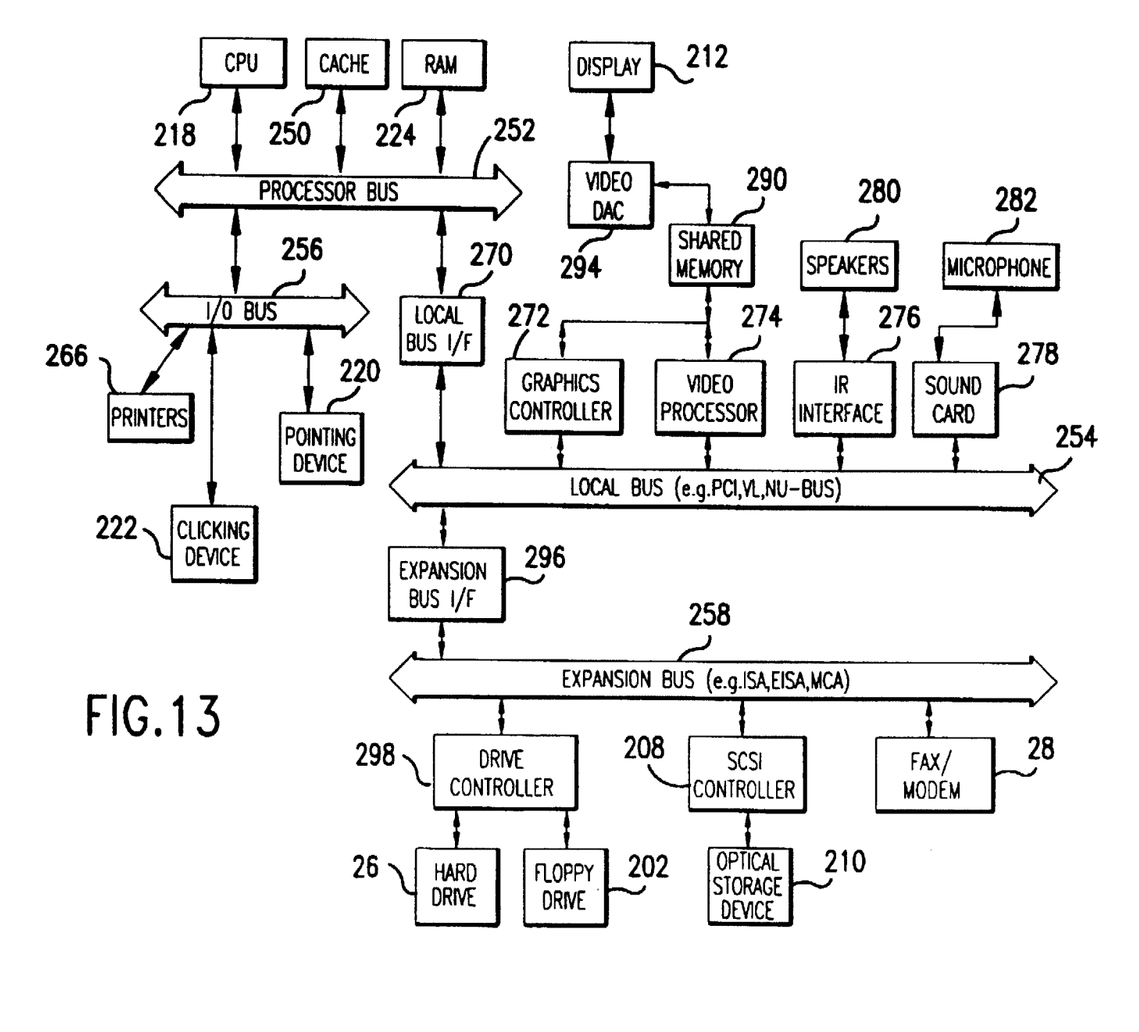
FIG. 13 is a block diagram of an exemplary notebook computer architecture.

FIG. 13 a system architecture for the notebook computer 10 configured to operate with multiple peripheral device. The computer 10 includes a processor 218, system memory (e.g., 224, 250), multiple communication busses 252, 254, 256, 258 and several system components and peripherals. The number and types of communication busses, system components and peripherals varies for differing embodiments. For the computer 10 shown, there is a processor bus 252, local bus 254, I/O bus 256 and expansion bus 258. The processor 218, external cache 250 and system RAM 224 are located on the processor bus 252. The I/O bus 256 is linked to the processor bus 252 for interfacing to I/O ports. A printer 266, pointing device 220 and clicking device 222 (e.g., mouse) typically are coupled to the I/O bus 256.

The local bus 254 is linked to the processor bus 252 via a local bus interface 270. Exemplary local busses are the video local (VL) or VESA-standard bus, the peripheral component interface (PCI) bus and the NU-BUS. The PCI bus, for example, may couple up to 10 peripheral devices. Illustrated are a graphics controller 272, video processor 274, infrared digital communication interface 276, and a sound card 278. Speakers 280 and a microphone 282 are linked to the sound card 278. The video subsystems 272, 274 typically share a local memory resource (i.e., frame buffer or video RAM) 290. Information is passed to a flat panel display 12 from the video subsystems and shared memory 290 via a video DAC 294.

The expansion bus 258 is linked to the processor bus 252 via the local bus 254 and an expansion bus interface 296. Peripherals, system components and mass storage devices typically are coupled to the expansion bus 258. Shown are a drive controller 298 coupling to a hard disk drive (mass storage device) 26 and a floppy disk drive 202, a SCSI controller 208 coupling to an optical storage device 210 or other SCSI peripheral, and a fax/modem 28. As an alternative to the SCSI controller 208, any of several proprietary controllers also may couple to an optical storage device 210. According to other architectures the hard drive 26 and/or the optical storage device 210 (e.g., CD-ROM) and there respective controllers instead are coupled to the local bus 254.

The architecture shown is an exemplary architecture. The notebook computer 10 embodies a proprietary or open architecture for a personal computer, PENTIUM computer, APPLE MACINTOSH computer, or other computer currently available or to come based on the Intel 80X86 architecture, Motorola 68XXX architecture, PowerPC architecture or other CISC processor architectures, RISC processor architectures and other single or multiple multiprocessor architectures. Alternatively the computer 10 embodies simpler architectures for hand-held computing devices or INTERNET communication devices.

Meritorious and Advantageous Effects

The notebook computer 10 has a locked state defined when the slide button 40, and thus linkage structure 50, are in the locked positions 44, 66. While in the locked state, modular units (e.g., batteries, hard drive, floppy drive, PC cards) are locked into openings or compartments (e.g., openings 22, 24) of the computer housing 20. In addition the input via the keyboard and pointing/clicking devices are disabled and the notebook computer 10, if docked, is prevented from undocking. If and when the display housing 18 is closed to the keyboard housing 20, the display housing 18 also is locked in place to prevent re-opening. Lastly, any optional features selected by the user to be incorporated into the security system are activated (e.g., the on/off switch is disabled). In a preferred configuration the user is still able to allow unattended operations, such as receiving e-mail, awaiting a fax or perform data synchronization via a docking port. The notebook computer 10 has an unlocked state defined when the slide switch 40, and thus linkage structure 50, are in the unlocked positions 42, 68. While in the unlocked state, the security measures are turned off (e.g., unlocking the clamshell, unlocking the peripheral units, enabling the keyboard and mouse, and enabling undocking).

One advantage of the invention is that only a single action is performed to switch the computer 10 into the locked state or the unlocked state. Another advantage is that the user can still allow unattended functions to be performed while security measures are active. Another advantage is that a user can configure some security measures to select optional components to be disabled with the security system (i.e., when the computer enters the locked state).

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A portable computing apparatus, comprising:

a case, a display, an input device, a processing unit, a modular unit, a lock and linkage;

wherein the case defines an opening, the modular unit removably inserted within the opening, wherein the linkage is coupled to the lock, the linkage movable between a first position and a second position, the linkage preventing removal of the modular unit while in the first position; and wherein the linkage is prevented from moving into the second position while the lock defines a locked condition; and wherein the case comprises:

a first housing within which is mounted the display; and a second housing within which is mounted the input device, processing unit and modular unit, the second housing defining the opening within which the modular unit is removably inserted; and wherein the first housing moves relative to the second housing between an open position for viewing the display panel and a closed position for storage;

wherein linkage is mounted within the second housing and prevents opening of the first housing relative to the second housing when the first housing is in the closed position and the linkage is in the first position.

2. The apparatus of claim 1, in which the linkage comprises a switch defining a switch first position and a switch second position, and a link which moves between the linkage first position and the linkage second position, the linkage further comprising a first member fixed relative to the link which limits removal of the modular unit while the linkage is in the first position and a second member fixed relative to the link which limits movement of the first housing out of the closed position while the first housing is in the closed position relative to the second housing and the linkage is in the first position; and wherein the link first position corresponds to the switch first position and the link second position corresponds to the switch second position.

3. A portable computing apparatus, comprising:

a case, a display, an input device, a processing unit, a modular unit, a lock and linkage;

wherein the case defines an opening, the modular unit removably inserted within the opening, wherein the linkage is coupled to the lock, the linkage movable between a first position and a second position, the linkage preventing removal of the modular unit while in the first position; and wherein the linkage is prevented from moving into the second position while the lock defines a locked condition; and further comprising a circuit for limiting operation of the apparatus while the linkage is in the first position.

4. A portable computing apparatus, comprising:

a case, a display, an input device, a processing unit, a modular unit, a lock and linkage;

wherein the case defines an opening, the modular unit removably inserted within the opening, wherein the linkage is coupled to the lock, the linkage movable between a first position and a second position, the linkage preventing removal of the modular unit while in the first position; and wherein the linkage is prevented from moving into the second position while the lock defines a locked condition; and wherein the input device is a keyboard; and further comprising a second input device for a user to issue commands to the computing apparatus and a circuit which disables the keyboard and the second input device while the linkage is in the first position and which enables the keyboard and input device while the linkage is in the second position.

5. A portable computing apparatus, comprising:

a case, a display, an input device, a processing unit, a modular unit, a lock and linkage;

wherein the case defines an opening, the modular unit removably inserted within the opening, wherein the linkage is coupled to the lock, the linkage movable between a first position and a second position, the linkage preventing removal of the modular unit while in the first position; and wherein the linkage is prevented from moving into the second position while the lock defines a locked condition; and further comprising a circuit having a first state during which the computing apparatus is precluded from being undocked from a docking station and a second state during which the circuit does not preclude the computing apparatus from being undocked from the docking station, the circuit being in the first state while the linkage is in the first position and being in the second state while the linkage is in the second position.

6. A portable computing apparatus, comprising:

a housing within which is mounted an input device, a processing unit and a modular unit, the second defining an opening, the modular unit removably inserted within the opening;

a lock mounted within the housing and defining at a given time either one of a locked condition and an unlocked condition;

linkage mounted within the housing and coupled to the lock, the linkage movable between a first position and a second position; and wherein the linkage limits removal of the modular unit while in the first position, and the linkage is prevented from moving into the second position while the lock defines the locked condition; and wherein the linkage is biased toward the second position and automatically moves into the second position when the lock switches into the unlocked condition; and a circuit having a first state during which a component of the computing apparatus is disabled and a second state during which the circuit does not disable the component, the circuit being in the first state while the linkage is in the first position and being in the second state while the linkage is in the second position.

7. The apparatus of claim 6, in which the housing is a first housing and further comprising a second housing, wherein the first housing moves relative to the second housing between an open position for viewing the display panel and a closed position at which the display panel is held to the second housing; and wherein the linkage prevents opening of the first housing relative to the second housing when the first housing is in the closed position and the linkage is in the first position.

8. The apparatus of claim 6, in which the circuit is a first circuit and further comprising a second circuit for optionally disabling a component of the apparatus while the linkage is in the first position.

9. The apparatus of claim 6, in which the circuit is a first circuit and further comprising a second circuit having a first state during which the computing apparatus is precluded from being undocked from a docking station and a second state during which the second circuit does not preclude the computing apparatus from being undocked from the docking station, the circuit being in the first state while the linkage is in the first position and being in the second state while the linkage is in the second position.

10. A method for securing access to a portable computing apparatus, the apparatus comprising a case, a lock, a linkage and a circuit, and wherein an input device, a processing unit, a modular unit, the lock and the linkage are mounted within the case, wherein the case defines an opening, the modular unit removably inserted within the opening, wherein the lock defines at a given time either one of a locked condition or an unlocked condition, and wherein the linkage is coupled to the lock and movable between a first position and a second position, and wherein the circuit has a first state and a second state, the method comprising the steps of:

defining a locked state for the computing apparatus via a first action;

wherein the first action comprises switching the lock to define the locked condition, and wherein the step of defining comprises the steps of:

moving the linkage into the first position, wherein the linkage limits removal of the modular unit; and entering the circuit into the first state, during which operation of a component of the computing apparatus is disabled; and wherein the linkage is prevented from moving into the second position while the lock defines the locked condition.

11. The method of claim 10, further comprising the step of defining an unlocked state for the computing apparatus via a second action, the second action comprising switching the lock into the unlocked condition, and wherein the step of defining an unlocked state comprises the steps of:

moving the linkage into the second position, within which the linkage does not limit removal of the modular unit; and entering the circuit into the second state, during which the circuit does not disable the component.

12. The method of claim 11, in which the circuit is a first circuit and in which the computing apparatus further comprises a second circuit having a first state during which the computing apparatus is precluded from being undocked from a docking station and a second state during which the circuit does not preclude the computing apparatus from being undocked from the docking station, the circuit being in the first state while the linkage is in the first position and being in the second state while the linkage is in the second position, and wherein the step of defining the unlocked state further comprises the step of entering the second circuit into the second state.

13. The method of claim 10, in which the case comprises a first housing and a second housing, the first housing moving relative to the second housing between an open position and a closed position, wherein while said linkage is in the first position and the first housing is in the closed position, the linkage prevents movement of the first housing into the open position.

14. The method of claim 10, in which the circuit is a first circuit and in which the computing apparatus further comprises a second circuit having a first state during which the computing apparatus is precluded from being undocked from a docking station and a second state during which the circuit does not preclude the computing apparatus from being undocked from the docking station, the circuit being in the first state while the linkage is in the first position and being in the second state while the linkage is in the second position, and wherein the step of defining further comprising the step of entering the second circuit into the first state.

15. The method of claim 10, in which the circuit is a first circuit and the component is a first component, and in which the computing apparatus further comprises a second circuit having a first state and a second state, the method further comprising the step of configuring the computing apparatus to either one of enabling or disabling the second circuit, and wherein the step of defining further comprises the step of entering the second circuit into the first state when the second circuit is enabled, and wherein while the second circuit is in the first state a second component is disabled.

16. A method for securing access to a portable computing apparatus, the apparatus comprising an input device, a first housing, a second housing, a lock, linkage and a circuit, and wherein a display panel is mounted within the first housing, and a keyboard, a processing unit, a modular unit, the lock and the linkage are mounted within the second housing, wherein the second housing defines an opening, the modular unit removably inserted within the opening, wherein the first housing moves relative to the second housing between an open position for viewing the display panel and a closed position at which the display panel is held to the second housing, wherein the lock defines at a given time either one of a locked condition or an unlocked condition, and wherein the linkage is coupled to the lock and movable between a first position and a second position, and wherein the circuit has a first state and a second state, the method comprising the steps of:

- defining a locked state for the computing apparatus by moving the linkage into the first position;
- defining an unlocked state for the computing apparatus by switching the lock into the unlocked condition;
- wherein while the linkage is in the first position, the linkage prevents removal of the modular unit and prevents opening of the first housing relative to the second housing when the first housing is in the closed position; and
- wherein the circuit switches into the first state as the linkage moves into the first position, and wherein the keyboard and input device of the computing apparatus are disabled by the circuit when in the first state;
- wherein the linkage is prevented from moving into the second position while the lock defines the locked condition;
- wherein while the linkage is in the second position, the linkage does not prevent removal of the modular unit and does not prevent opening of the first housing relative to the second housing; and
- wherein the circuit switches into the second state as the linkage moves into the second position, and wherein the circuit does not disable the keyboard and pointing device during the second state.

17. The method of claim 16, in which the circuit is a first circuit and in which the computing apparatus further comprises a second circuit having a first state during which the computing apparatus is precluded from being undocked from a docking station and a second state during which the circuit does not preclude the computing apparatus from being undocked from the docking station, the circuit being in the first state while the linkage is in the first position and being in the second state while the linkage is in the second position, and wherein the step of defining a locked state further comprises the step of entering the second circuit into the first state, and wherein the step of defining the unlocked state further comprises the step of entering the second circuit into the second state.

18. A method for securing access to a portable computing apparatus, the apparatus comprising an input device, a first housing, a second housing, a lock, a linkage and a circuit, and wherein a display panel is mounted within the first housing, and a keyboard, a processing unit, a modular unit, the lock and the linkage are mounted within the second housing, wherein the second housing defines an opening, the modular unit removably inserted within the opening, wherein the first housing moves relative to the second housing between an open position for viewing the display panel and a closed position at which the display panel is held to the second housing, wherein the lock defines at a given time either one of a locked condition or an unlocked condition, and wherein the linkage is coupled to the lock and movable between a first position and a second position, and wherein the circuit has a first state and a second state, the method comprising the steps of:

- defining a locked state for the computing apparatus by moving the linkage into the first position;
- defining an unlocked state for the computing apparatus by switching the lock into the unlocked condition;
- wherein while the linkage is in the first position, the linkage prevents removal of the modular unit and prevents opening of the first housing relative to the second housing when the first housing is in the closed position; and
- wherein the circuit switches into the first state as the linkage moves into the first position, and wherein the keyboard and input device of the computing apparatus are disabled by the circuit when in the first state;
- wherein the linkage is prevented from moving into the second position while the lock defines the locked condition;
- wherein while the linkage is in the second position, the linkage does not prevent removal of the modular unit and does not prevent opening of the first housing relative to the second housing; and
- wherein the circuit switches into the second state as the linkage moves into the second position, and wherein the circuit does not disable the keyboard and pointing device during the second state; and
- wherein the circuit is a first circuit, and in which the computing apparatus further comprises a second circuit having a first state and a second state, the method further comprising the step of configuring the computing apparatus to either one of enabling or disabling the second circuit, and wherein the step of defining the locked state further comprises the step of entering the second circuit into the first state when the second circuit is enabled, and wherein while the second circuit is in the first state an on/off switch for activating the computing apparatus is disabled.

19. A portable computing apparatus, comprising:

a case, a display, an input device, a processing unit, a lock and linkage;

wherein the linkage is coupled to the lock, the linkage movable between a first position and a second position;

wherein the linkage is prevented from moving into the second position while the lock defines a locked condition;

said case further comprising:
- a first housing within which is mounted the display; and
- a second housing within which is mounted the input device and processing unit;

wherein the first housing moves relative to the second housing between an open position for viewing the display and a closed position for storage; and wherein the linkage is mounted within the second housing and prevents opening of the first housing relative to the second housing when the first housing is in the closed position and the linkage is in the first position; and further comprising a circuit for limiting operation of the apparatus while the linkage is in the first position.

20. A portable computing apparatus, comprising:

a case, a display, an input device, a processing unit, a lock and linkage;

wherein the linkage is coupled to the lock, the linkage movable between a first position and a second position;

wherein the linkage is prevented from moving into the second position while the lock defines a locked condition;

said case further comprising:
 a first housing within which is mounted the display; and
 a second housing within which is mounted the input device and processing unit;

wherein the first housing moves relative to the second housing between an open position for viewing the display and a closed position for storage; and wherein the linkage is mounted within the second housing and prevents opening of the first housing relative to the second housing when the first housing is in the closed position and the linkage is in the first position; and wherein the input device is a keyboard and further comprising a second input device for a user to issue commands to the computing apparatus, and a circuit which disables the keyboard and the second input device while the linkage is in the first position and which enables the keyboard and the second input device while the linkage is in the second position.

21. A portable computing apparatus, comprising:

a case, a display, an input device, a processing unit, a lock and linkage;

wherein the linkage is coupled to the lock, the linkage movable between a first position and a second position;

wherein the linkage is prevented from moving into the second position while the lock defines a locked condition;

said case further comprising:
 a first housing within which is mounted the display; and
 a second housing within which is mounted the input device and processing unit;

wherein the first housing moves relative to the second housing between an open position for viewing the display and a closed position for storage; and wherein the linkage is mounted within the second housing and prevents opening of the first housing relative to the second housing when the first housing is in the closed position and the linkage is in the first position; and further comprising a circuit having a first state during which the computing apparatus is precluded from being undocked from a docking station and a second state during which the circuit does not preclude the computing apparatus from being undocked from the docking station, the circuit being in the first state while the linkage is in the first position and being in the second state while the linkage is in the second position.

22. A portable computing apparatus, comprising:

a case, a display, an input device, a processing unit, a lock and linkage;

wherein the linkage is coupled to the lock, the linkage movable between a first position and a second position;

wherein the linkage is prevented from moving into the second position while the lock defines a locked condition;

said case further comprising:
 a first housing within which is mounted the display; and
 a second housing within which is mounted the input device and processing unit;

wherein the first housing moves relative to the second housing between an open position for viewing the display and a closed position for storage; and wherein the linkage is mounted within the second housing and prevents opening of the first housing relative to the second housing when the first housing is in the closed position and the linkage is, in the first position: and wherein the linkage comprises a switch defining a switch first position and a switch second position, and a link which moves between the linkage first position and the linkage second position, the linkage further comprising a first member fixed relative to the link which limits movement of the first housing out of the closed position while the first housing is in the closed position relative to the second housing and the linkage is in the first position; and wherein the link first position corresponds to the switch first position and the link second position corresponds to the switch second position.

* * * * *